(12) United States Patent
Alldredge

(10) Patent No.: US 7,325,136 B2
(45) Date of Patent: Jan. 29, 2008

(54) METHOD AND APPARATUS FOR SECURED ELECTRONIC COMMERCE

(76) Inventor: Robert L. Alldredge, 130 Pearl St., Apt. 1108, Denver, CO (US) 80203

( * ) Notice: Subject to any disclaimer, the term of this patent is extended or adjusted under 35 U.S.C. 154(b) by 0 days.

(21) Appl. No.: 11/308,798

(22) Filed: May 5, 2006

(65) Prior Publication Data
US 2007/0189542 A1    Aug. 16, 2007

Related U.S. Application Data

(63) Continuation of application No. 10/905,694, filed on Jan. 17, 2005, now Pat. No. 7,043,025, which is a continuation of application No. 09/944,761, filed on Aug. 31, 2001, now abandoned.

(51) Int. Cl.
H04L 9/00 (2006.01)

(52) U.S. Cl. .................. 713/171; 380/283; 380/45; 705/26; 705/42; 726/10

(58) Field of Classification Search ............... 380/283, 380/44, 45; 705/26, 42; 713/171; 726/10
See application file for complete search history.

(56) References Cited

U.S. PATENT DOCUMENTS 5,341,426 A * 8/1994 Barney et al. ............... 713/171
6,029,150 A * 2/2000 Kravitz ........................ 705/39
6,711,264 B1 * 3/2004 Matsumoto et al. ........ 380/283

* cited by examiner

Primary Examiner—Emmanuel L. Moise
Assistant Examiner—Paul Callahan
(74) Attorney, Agent, or Firm—Kyle W. Rost

(57) ABSTRACT

A user anonymously acquires a first sequence of encryption key material. An encryption server, having a second sequence complementary to the first sequence, receives and forwards encrypted messages and monitors utilization of encryption key material by the user. As the key material is used, the server adjusts user accounts to exhaust the first sequence. Thus, the first sequence provides for secure, anonymous communication and, correspondingly, can serve as a payment media for conducting electronic transactions.

5 Claims, 2 Drawing Sheets

METHOD AND APPARATUS FOR SECURED ELECTRONIC COMMERCE

CROSS-REFERENCE TO RELATED APPLICATIONS

This is a Continuation of U.S. application Ser. No. 10/905,694, filed Jan. 17, 2005, now U.S. Pat. No. 7,043,025, which is a Continuation of U.S. application Ser. No. 09/944,761, filed Aug. 31, 2001, now abandoned.

TECHNICAL FIELD

The present invention relates to data communications and more particularly to a method and apparatus for secure communications that maintain the privacy of a user.

Electronic communications and commerce, such as messages or monetary transactions transmitted between computers, on a network, or over the "internet" or world wide web, face challenges tied to the use of electronic transmissions. A user or customer can find and communicate with a business substantially anywhere in the world. Typically, electronic businesses' product may include communications, goods, services, research materials, and amusements. Some of this product may be provided at no cost, for purposes of publicity and goodwill. Other product is of greater value and is made available at a monetary cost. For many businesses, the ability to conduct monetary electronic transactions will be essential, or the business may find no sufficient reason to continue presenting an electronic presence.

Whether an electronic transaction is carried over copper wires, optic fibers, or broadcast waves, three long standing problems that remain inadequately resolved are establishing a reliable monetary basis for transactions between businesses and customers who are strangers to each other, loss of transaction privacy through eavesdropping, and monetary theft through interception and reuse of transmitted financial information. Security and encryption methods are helpful but incomplete solutions.

Both individuals and businesses face threats to their privacy and security through outside monitoring or intrusion into their transactions. Numerous aspects of business and personal activity are reflected by electronic transactions, which are easy to monitor. It has been suggested to increase security by dividing portions of a transaction over different types of transmissions, for example by selecting among internet, telephone, facsimile, and electronic messaging or e-mail. Yet, all of these are equally subject to interception and monitoring. At both the individual and business level there exists the dangerous possibility that a competitor could learn trade secrets, confidential business information, or sensitive financial plans, including competitive plans, inventions, and business strategy. Individuals may suffer exposure of highly personal matters, their physical and mental health; salary; employment or loss of employment; political, social and religious beliefs; and sensitive communications with doctors, lawyers or clergymen. These examples merely touch upon areas where privacy is reasonably expected and where outside monitoring is an unjustified, highly violative intrusion into this expectation.

Transactions in electronic commerce are conducted by transmission of information. Unauthorized persons learning the information have the ability to conduct fraudulent transactions or otherwise may violate the privacy of those engaged in the transaction. Security systems attempt to prevent unauthorized persons such as eavesdroppers or "hackers," from learning useful information. For example, a security system may encrypt the transaction so that a hacker sees only coded messages that likely are undecipherable. At still another level, the identity of the parties to the transaction may be shielded.

One method of achieving private communication is by the sender encrypting his message, which then is decrypted by the recipient. There are two basic types of cryptographic systems, symmetric and asymmetric. In a systemic cryptographic system, also known as conventional or secret key, both the message is encrypted into cryptotext by the sender and decrypted into plaintext by the recipient with the same key. The security of a message can be entirely adequate as long as both the sender and the recipient know the key and the key remains exclusive to the two parties. However, in ordinary commerce a symmetric cryptographic system is not feasible, since the parties generally will not have an established exclusive key.

A One-Time-Pad cryptographic system is a known symmetric cryptographic system where the sender and recipient each have an identical "pad" of random bits. The sender encrypts an n bit message with the next n bits from the sender's pad and the recipient decrypts the message with the same n bits from the recipient's pad. Each bit is used once and then destroyed. A true One-Time-Pad cryptographic system is provably unbreakable since an encrypted n bit message is equally likely to decrypt into any n bit message. One-Time-Pad cryptographic systems have three limitations. The bits of the pad must be truly random, not pseudo random bits generated by an algorithm, and therefore may be expensive to generate. Reuse of a pad seriously compromises the security of the system. One-Time-Pad cryptographic systems require generation and distribution of one bit of key for each bit of electronic transmission.

Another known symmetric cryptographic system starts with the broadcast, such as from a satellite, of a high speed, continuously generated stream of random numbers. The sender and recipient agree on a point or time to start pulling numbers from the stream, and encrypt and decrypt messages with the sequence of numbers starting at the agreed start time. The key in this system vanishes as soon as the key is used. The system relies on the high speed, continuously generated stream exceeding data storage capacity. A third party seeking to intercept and decrypt a message must happen to be storing numbers at the agreed start time. The third party cannot decrypt the message if the third party learns of the agreed start time afterwards and then starts storing numbers from the stream.

In asymmetrical cryptographic systems, also known as public key systems, commercial privacy is conveniently established by use of a two key system, commonly referred to as public and private keys. A private key is secret to the user, while a public key is open for anyone to know. Thus, the public key can be openly sent to initiate a transaction, or it can be listed in a public directory. The two keys are complimentary to each other in that either one can decode a message encoded by the other. Neither key can decode a message that was encoded using that same key, and knowledge of the public key does not enable the private key to be determined. Anyone wishing to send a secure message can use the recipient's public key to encrypt the message prior to sending. The recipient will be the only party having the private key needed to decrypt the message. Asymmetric cryptographic systems require significantly larger keys, and therefore significantly more processing time to encrypt and decrypt, than symmetric cryptographic systems to provide the same level of security.

In a variation that utilizes the respective strengths of symmetric key and asymmetric key systems, a sender encrypts a message with a symmetric key. The sender encrypts the symmetric key, often called a session key, with the recipient's public key. Both the coded message and the encrypted session key are sent to the recipient, who decrypts the session key by using the recipient's private key. The recipient then decrypts the message with the session key.

Messages encrypted with a symmetric key system are automatically authenticated since the sender is the only one other than the recipient that knows the key. Messages encrypted with an asymmetrical key system can be authenticated with a "digital signature". The sender generates a digest or hash of the message, and encrypts the digest with the sender's private key to create the digital signature. The sender sends the message, encrypted with the recipient's public key, and the digital signature to the recipient. The recipient decrypts the message with the recipient's private key, generates a digest of the message, decrypts the digital signature with the sender's public key, and verifies that the recipient generated digest and the decrypted digital signature match. In a further variation creating another layer of privacy, at the time of sending the message, the sender can encrypt the digital signature with the recipient's public key.

Data packets of any description can be sent over a network from a sender to a recipient. Typical network structure involves numerous nodes, each node joined to neighboring nodes by links. Various systems are known for routing data packets from a sending node to a destination node. According to a system referred to as "broadcasting," a packet is sent to every node in the network, eventually reaching the intended destination. This method tends to be reliable although costly due to redundant transmissions. "Path specific routing" is another method, in which the sender establishes the path to the recipient. This latter method is less costly although not as reliable, because a single failure in the path can cause loss of a message.

U.S. Pat. No. 5,455,865 discloses a method of data packet routing over a network that may contain malicious failures. The sending node within one of several sub-networks contains information of the local topology of the network and computes a route at least to a router for that sub-network. This routing information is contained in the packet. The router computes the route to another router at another sub-network. This process is repeated until the packet reaches the router at the sub-network of the recipient, which determines a route to the recipient.

U.S. Pat. No. 5,751,813 discloses a method of using an encryption server to receive and forward a message in such a way that eavesdroppers learn neither the content of the message nor the routing. The sender encrypts his transmission at two levels: content is encrypted with the sender's private key, and the identity of the sender and recipient are encrypted with the encryption server's public key. The encryption server receives such message and uses the server's private key to decrypt the second level of encryption, yielding identification of sender and recipients. The content of the message remains encrypted with the sender's private key. The encryption server determines the identity of each recipient and then uses the public key corresponding to each recipient to re-encrypt the message content and the identification of the sender. The encryption server then forwards the individually encoded versions of the message to each corresponding recipient. Each recipient decrypts the entire message using two keys, the recipient's private key and the sender's public key. This system delivers an encrypted message to the recipient while protecting its confidentiality even from the encryption server. It also protects the confidentiality of the sender's identity and protects the fact that the sender is communicating with the particular recipients. Due to the different encryptions of incoming and outgoing messages at the encryption server, an eavesdropper would have difficulty correlating which sender communicated with which recipient.

U.S. Pat. No. 5,479,514 discloses a method of secure communication among private network nodes, allowing data to pass through selected non-private transmission nodes without sharing encryption keys with those non-private transmission nodes. Thus, independent vendors having nodes located in the private network of another business need not be informed of encryption keys, and it is not necessary for each private node to maintain a list of keys known to each other private node. Each encrypted data packet carries the identification of the encrypting node and of a designated decrypting node that need not be the next node in the network system. However, each pair of sending and receiving nodes shares a known key. The designated decrypting node recognizes its own identification in the packet and performs decryption followed by re-encryption with a second key, and forwards the packet to still another designated decrypting node that knows the second key. This process is repeated until the intended ultimate recipient node receives the packet. Independent vendor's nodes are bypassed in the encryption/decryption process, preventing loss of security while still eliminating proliferation of keys.

U.S. Pat. No. 5,574,785 discloses a method of communication in which a data packet carries an identifier for a cipher key known to both the sender and recipient. If this identifier is incorrectly transmitted, the method provides a way for the recipient to discover the correct cipher key without further communicating with the sender. The packet carries appended data that, if correctly decrypted, will be of known form or content. Thus, if the appended data decrypts incorrectly, the recipient can test other cipher keys until the appended data decrypts correctly.

The prior known systems provide a partial foundation for secure and private communications. However, no one encryption system is likely to serve all areas of commerce or communications. The identity of the user is known to the server in each of the prior known systems, so these systems do not completely protect the privacy of the user. Prior known systems do not provide a method or apparatus to transfer value from a user to an electronic business, in exchange for goods or services, that protect the privacy of the user from the server and the electronic business.

Certain encryption software cannot be exported from the United States. Because the United States is significant to many transactions, software export restrictions can discourage commerce with other countries. It would be desirable for international commercial purposes to have a communications system with a borderless reach that provides secure, private business transactions. Finally, it would be highly desirable for a borderless commercial system to provide an electronic or internet currency, so that electronic or internet commerce could be truly borderless.

DISCLOSURE OF THE INVENTION

According to the method of the present invention, secured anonymous electronic commerce takes place through an encryption server. First and second sequences of encryption key material are provided with the two code sequences defining a pair of sequences in which each sequence of the pair is suited for decrypting a message that has been encrypted using the other sequence of the pair. An anonymous first user is provided the first sequence, encryption software, connection software, and an identifier associated with the first sequence, in exchange for a payment. The second sequence of is provided to the encryption server and an account associated with the encryption server is established to track a value associated with use of the encryption key material of at least the first sequence. The first user encrypts data and transmits the encrypted data to the encryption server. The encryption server decrypts at least a portion of the encrypted data by using the second sequence and adjusts the tracked value of the account in response to the utilization of the encryption key material of at least the first sequence. Apparatus for secured electronic commerce includes a portable data storage device, a data processing device and an encryption server. The portable data storage device has the first sequence, the identifier, the encryption software, the connection software and an associated value. The data processing device is operable to access the portable data storage device to encrypt and decrypt data and connect to the encryption server, which has the second sequence, to provide anonymous encrypted communication with the encryption server. The identifier is associated with the first sequence to assure that a user remains anonymous to the encryption server as well as any party that might intercept the encrypted data.

Details of this invention are described in connection with the accompanying drawings that bear similar reference numerals in which.

DETAILED DESCRIPTION OF THE INVENTION

Figure 1:
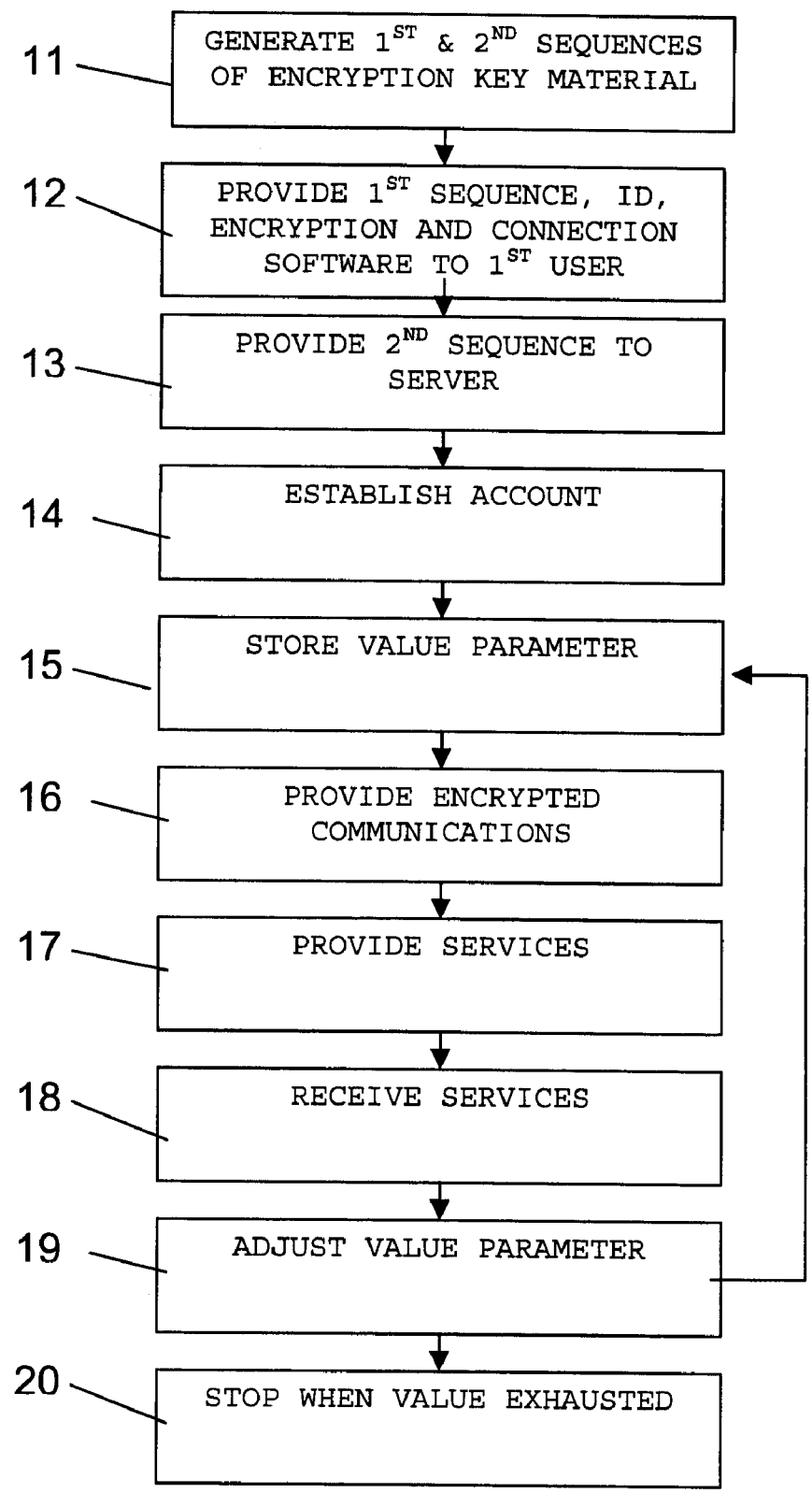
FIG. 1 is a schematic block diagram of a method embodying features of the present invention.

Referring to FIG. 1, a method of secured electronic commerce includes providing first and second sequences of encryption key material 11; providing to an anonymous first user, in exchange for a payment, the first sequence, an identifier associated with the first sequence, encryption instructions and connection instructions 12; providing the second sequence to an encryption server 13; establishing an account accessible to the encryption server 14; storing a value parameter associated with the first sequence in the account 15; providing encrypted communications between the first user and the encryption server 16; providing services to the first user in response to the encrypted communications 17; receiving services from the first user in response to the encrypted communications 18; adjusting the value parameter in response to providing the encrypted communications and in response to providing and receiving services 19; and ceasing providing encrypted communications and services when the value parameter is exhausted 20.

The first and second sequences of encryption material of the step of providing first and second sequences of encryption key material 11 are complementary sequences such that the encryption key material of the one sequence decrypts encrypted messages that have been encrypted with the other sequence. In the preferred embodiment, the first and second sequences are identical one time pads. Alternatively, the first and second sequence can be sequences of identical session keys or a plurality of complimentary public and private keys.

In broad outline, the operation of the system is initiated by a first user, who in various specific types of transactions mentioned hereafter may be called a message sender or a buyer, whether an individual or legal entity. In other instances, the initiating party may be a message receiver, merchant, or seller. As a general term of reference, the initiating party will be referred to as a user. Because the system of commerce is electronic, the user may be an entity utilizing a computer or may be the computer, itself, when programmed to function within the system. Further, the user may be any of various alternative electronic communication devices that perform functions similar to a computer. For example, various specialty electronic communication devices are known for conducting on-line activities over telephone lines, cable television lines, optic fiber lines, and wireless communications modes. The latter may communicate using wireless transmission and reception systems, which may include satellite or land-based systems.

The operation of the processing system provides for the existence of a supervisory entity through which the user communicates. The supervisory entity may be an electronic computer containing programmed instructions for operating within the system. According to present practice of conducting on-line commerce, this supervisory entity may be a computer-server operating within a network of computers. A computer-server may be regarded as being a hub or node in a network, through which a plurality of users are electronically connected for communicating with other portions of the network. The network may be a public network such as the Internet or World Wide Web, a different public network, or a private network.

This supervisory computer will be generally referred to as an encryption server. The significant purposes served by the encryption server are electronic communication to and from users; encryption and decryption of such communications, forwarding of communications to recipients and mesne recipients, receipt of reply communications from recipients and mesne recipients, monitoring existence of encryption code sequences, generating encryption code sequences, utilizing encryption code sequences, canceling or expiring encryption code sequences, and accounting for transactions in code sequences.

In the step of providing to an anonymous first user, in exchange for a payment, the first sequence, an identifier associated with the first sequence, encryption instructions and connection instructions 12, a user acquires the first sequence. Preferably the first sequence is acquired indirectly so that the user can remain anonymous. In the preferred embodiment of the method, the user buys a portable data storage device having the first sequence in a retail transaction. Alternatively, the first sequence could be downloaded by the user using an aliased identity. The identifier is a unique sequence of bytes and can be the only identification for the first sequence.

The connection instructions and encryption instructions may be acquired by the user with the first sequence and identifier or may be acquired otherwise, such as by downloading from the encryption server. The connection instructions are generally in the form of software that can be processed by a computer to connect to the encryption server, including telephone numbers for telephone connection and handshakes. Since telephone numbers may be blocked or may change for security reasons, the connection instructions generally will include a large number of telephone numbers to be tried successively. The connections instructions, including the telephone numbers, may also be updated during the step of providing encrypted communications between the first user and the encryption server 16, described hereinafter.

The encryption instructions generally include software that is applied to data to encrypt or decrypt the data. The encryption instructions also control the usage of the first sequence. As examples, and not as limitations, where the first sequence comprises a plurality of session keys, the encryption instruction may retire the last used key and use a new key each time the user initiates a connection, after a predetermined number of bytes of communication, after a predetermined connection time, or after a predetermined chronological time, such as each day. Where the first sequence comprises a one-time pad, the encryption instructions prevent reuse of any portion of the first sequence.

Providing the second sequence to an encryption server 13 includes storing the second sequence on a data storage device accessible to the encryption server. An account, associated with the first and second sequences, is established as an account accessible to the encryption server 14, and a value parameter, associated with the first sequence, is stored in the account 15. The value parameter is generally a monetary value and may further represent a predetermined amount of time for network access, service provision and electronic messaging.

Providing encrypted communications between the first user and the encryption server 16 is initiated by the user preparing a message containing preselected data such as an instruction set or request. While the content of the message is variable according to requirements of the user, the message can be regarded as an item of value, such as a purchase order. The user communicates the message to the encryption server, for example, instructing the encryption server as to a service or product the user desires.

The message is encrypted for the transmission from the user to encryption server. The encryption utilizes the first sequence obtained by the user. The user computer may perform the encryption, using encryption programming available to it. There are many encryption systems known, including transaction keys, public and private key systems, and the like. The specific software and system is selectable according to the needs and desires of the parties, with due regard to local, national and international regulations. The encryption programming may be software that was obtained with or associated with the first sequence. Alternatively, the software may be obtained from the encryption server either prior to or approximately contemporaneously with the transmission to the encryption server.

The encryption server receives the encrypted transmission from the user. The encryption server is structured and programmed to decrypt the encrypted message received from the user. Such decryption may be of a preselected part of the message or the entire message. For example, it may be programmed that the encryption server decrypts only a designated part of the message that identifies an intended end recipient or mesne recipient. Depending upon the requirements of the method of encryption used, decryption may utilize the same key employed by the user to perform the encryption. Alternatively, decryption may employ a complimentary set of data that is available to the encryption server, such as a public or private key of a public key and private key system. An important aspect of the invention is that the encryption server has available the decryption key, enabling the encryption server to decrypt the user's message, as required.

With this encrypted transmission to the encryption server, the invention has achieved its initial goal. The user has dispatched a transmission that is difficult to intercept by an unauthorized source such as an electronic eavesdropper. The user has maintained his anonymity from such eavesdropper and, perhaps, from the encryption server, itself. With this achievement, the system of this invention allows further steps and alternatives.

In one form of the invention, the entire message may have been directed to the encryption server. Accordingly, the encryption server decrypts the entire message and acts upon it. For example, the message may instruct a search for a source of a product or service. The encryption server acts upon this instruction by seeking such a source. For purposes of carrying out instructions, the encryption server is programmed to carry out a search over the connected network. The encryption server carries out the search function and locates a source of the desired service or product. Such source may be referred to as the service provider. The encryption server may direct a portion of the described functions to a mesne recipient, such as an Internet search engine. Further, the timing of the encryption server operations may be delayed substantially from receipt of the message, so that eavesdroppers cannot correlate the search with the user's encrypted message.

In the step of providing services to the first user in response to the encrypted communications 17, the invention provides a method and apparatus for secure electronic commerce, which may include the transfer of products or services. The scope of the transferred products may include messages, data, services, tangible and intangible goods, and financial credits such as money.

When the encryption server has obtained the requested service or product, it follows further programming for encrypting the desired service or product in a message, or, where applicable, a verification of the order, to the user. The message is encrypted using a system that allows the user to receive and decrypt it. A suitable encryption system employs the same sequence obtained by the user and known to the encryption server. The message, containing the requested product or service, is transmitted to the user, allowing the user to decrypt the received service or product.

The first user may at times function as a service provider and services may be received from the first user in response to the encrypted communications 18. The value parameter is adjusted in response to providing the encrypted communications and in response to providing services 19. As an example, and not a limitation, where the first sequence is a one time pad, the value parameter is adjusted in a manner proportional to the usage of the one time pad so that when the one time pad is used up, the value parameter is exhausted. The value parameter is also adjusted in proportion to the cost of service provided by service providers so that the service providers are paid, directly or indirectly, by the encryption server. The value parameter may be adjusted for services provided by the first user either directly, or indirectly by reducing the rate charged to the first user for the step of providing encrypted communications between the first user and the encryption server 16. The first user can thereby remain anonymous to the service providers as well as the encryption provider. When the value parameter is exhausted, the encryption server stops providing services and communication to the first user 20.

These functions are carried out in an environment that substantially eliminates the ability of eavesdroppers or hackers to know the content of a transaction. From this description, it should be evident that the processing system protects the user and the contents of the user's message from unauthorized disclosure. In particular, the user's privacy and anonymity are protected. Communications between the user and encryption server are conducted in a way that maintains anonymity, despite the possible need for the encryption server to further communicate the user's message to a third party service provider. The reply or product supplied by the service provider is directed only to the encryption server, further protecting the user from unauthorized publicity or loss of privacy.

The need for privacy has been documented in news reports of various commercial enterprises gathering and misusing information about individual customers. For example, some reports reveal the practice of placing small false charges on credit card bills of those who tend to make numerous small credit purchases and who, presumably, would be unlikely to notice an additional small charge. This type of misuse and invasion of privacy are avoidable. By encrypting the message from the user to the encryption server, and later in the process encrypting the return message from the encryption server to the user, the privacy of the user is ensured. Although a service provider or commercial vendor will know what product or service has been provided, the identity of the end customer is hidden from the service provider, from its employees, and from outside hackers and on-line pirates. Encrypting a request during transmission from an encryption server to a service provider, and encrypting the reply from the service provider to the encryption server may be desirable in some circumstances. However, protecting the identity and privacy of the user does not require such encryption to and from the ultimate service provider vendor.

Among possible practical applications of this system are utilization of shared software, retrieval of information, obtaining a product or service, or engaging in an amusement or recreation. These applications may be of subject matter presently available or hereafter conceived of.

A non-limiting example of such subject matter includes time-sharing computer programs, such as engineering, design, drafting, accounting, and scientific programs. The need for privacy in this utilization is clear, since sensitive business and financial data are likely to be processed. A related example is obtaining database contents, web site information, journal papers, and publications. To the competitor or eavesdropper, these inquiries could provide valuable insights into business plans, inventions, or personal interests.

Examples of a product or service may include medical advice, legal advice, office supplies, and real property. The importance and need for confidentiality of the transaction could range from trivial, for office supplies, to vitally important and valuable competitive information, such as the future site of a new store or development project.

Amusements may include games of chance, either with or without monetary wagering. The need for personal privacy is evident, since gambling is illegal or unacceptable in certain jurisdictions and societal groups. Even if the conduct of electronic gambling were conducted in such a manner as to be lawful, a gambler might suffer social penalties or personal embarrassment if his private gambling activity were publicly revealed. In one embodiment of the present invention a lossless gambling system credits the gambling gains to the account associated with the first sequence, debits losses, and invests the losses for the first user in investments that mature at a selected future time. The odds are biased in favor of the provider of the lossless gambling, as is true of other known gambling providers, so the first user will eventually exhaust the value parameter. The provider profits by the float from the time the first user purchases the first sequence until the first user loses value.

In one embodiment, the system creates and manages encrypted electronic messaging or "e-mail." Messaging transactions can be carried out in at least three distinct ways. According to a first method, a sender, who is the user, protects his own privacy by ensuring that only encrypted communication is sent between himself and the encryption server. According to a second method, the first method is extended to ensure that only encrypted communication is sent from the encryption server to the service provider regarding the user's messages. The third method extends the second, by ensuring that any response from the service provider to the encryption server is encrypted, as well. A fourth possible variation of method could offer the option of not encrypting the responsive communication sent from the encryption server to the user; however, this option would seem to be of little interest to the user who is seeking privacy.

Additional variations are possible in the transmissions between the encryption server and service provider. These methods vary according to the party bearing the expense of encryption. These variations allow the encrypted communications between the encryption server and service provider to be either at the user's expense or at the service provider's expense. The choice between these variations may depend upon the relationship between the user and the service provider. For example, in a communication between strangers, the service provider may have no interest in encryption, leaving the choice to the user, in which case the user merely needs to instruct the encryption server how to handle the response. However, if the user and service provider have an existing relationship, each one may wish to provide encryption between itself and the encryption server.

According to the first method, the encrypted messaging is conducted between a user and a second party receiver, which is the encryption server. In the second method, the encrypted messaging is further conducted between the encryption server and a third party receiver, the service provider. The encryption server may be an encryption server that maintains the anonymity of at least the user and perhaps of both the user and third party receiver.

An encryption server may perform a variety of steps that make it difficult for an eavesdropper to breach the privacy of those using the server. A basic step is the ability of the server to encrypt and decrypt messages and to both transmit and receive encrypted messages. Further, it may change the appearance of a message it receives for forwarding by encrypting the message in a different key. Thus, incoming and outgoing messages are difficult to correlate. In addition, it may scramble the order of messages and vary the communication methods. By these means, the encryption server performs as an intermediary between the sender and third party receiver.

Both sender and third party receiver can be maintained as anonymous, even to the encryption server. While anonymity can be maintained, the encryption server requires certain minimum information in order to carry out is communication functions. These items of minimum information can be supplied in an anonymous way by using a one-time-pad, or OTP system. The only identity required is an identification means related to the first and second sequences.

In an alternative embodiment, the user provides a communication point, such as a telephone number, to the encryption server to enable the encryption server to contact the user. Another type of communication point is an e-mail box. The encryption server may provide an e-mail box that corresponds to the identifier of the first sequence. With this latter system, the encryption server will have no knowledge of the sender or of the third party receiver, although it will be incumbent upon the sender and third party receiver to check his mail.

The invention may be used for transmitting confidential messages between parties other than the encryption server, for example by providing cooperating sequences of encryption key material to both the user and service provider. The user may obtain the pair of sequences and supply the second sequence to the service provider, thus allowing the encryption and decryption of electronic messages between them. These messages may be email or another type of messages sent over the Internet, which may include service or data transmissions. Together the two sequences define a cooperating pair, and each pair may be associated with one or more identifying numbers, such as an identification and tracking account number and an e-mail account. Each sequence of the pair contains data suitable for identifying or linking to the account(s) common to the pair of sequences. The account is known to the encryption server, for monitoring and debiting purposes.

A first sequence contains encryption data suitable for encrypting a message, such as at one end of a transmission, which will be termed the sending end. The second sequence contains data suitable for decrypting the same message at the second end of the transmission, which will be termed the receiving end. The data on each sequence may be identical random number sequences. Thus, encryption data and decryption data may constitute the same data on each pad. The use of identical data is an advantage, as it simplifies tracking and accounting for sequence usage and exhaustion. Other encryption and decryption systems are known and may be used with suitable modifications to the tracking software used by the encryption server. The encryption server contains programmed instructions suitable to recognize the first sequence and to obtain, recall, or create a tracking account and, if desired, an e-mail account, corresponding to the first sequence.

The sender creates a message that he desires to send in encrypted form to the third party receiver. The sender places the message in a computer file, computer memory, an e-mail box, or another location where it can be found by the encryption server. As a preliminary step, the sender may encrypt his message by any suitable means. Commonly used encryption means are a transaction key or a private and public key system. Alternatively, the sender may forgo the preliminary encryption and allow the message to be in plain text, thus relying solely upon the one time pad for eventual encryption security. Regardless of which preliminary encryption, if any, is selected and used, the sender determines when his message is ready for transmission and notifies the encryption server. The notification may by a direct telephone call or by e-mail message to an e-mail box associated with the first sequence. A preferred type of notification is by telephone line, such as by using a designated line or telephone number associated with the encryption server. The notification may be accomplished by the connection instructions. Software programming may accomplish the notification by directing a computer to call the encryption server by use of a computer-controlled device, such as a modem. The connection instructions may provide a toll-free number or other calling system that costs the caller nothing, or whose cost is incorporated into a cost of obtaining the first sequence.

The telephone notification, under computer control, notifies the encryption server that the user of a specific first sequence, i.e., the sender, is prepared to send a message. The notification may include sufficient data to enable the encryption server to return a communication to the sender. Thus, the software can identify the calling number or an electronically accessible on-line address. The encryption server terminates the sender's initial telephone call or other form of communication as soon as the server has received sufficient data to enable a return communication. The encryption server then prepares to receive the sender's message.

When the encryption server is prepared to receive the sender's message, it will return a communication to the sender. For example, the encryption server may enter a return call to the sender's computer, e-mail box, or such other location or facility that provides access to the message. It is not necessary that the sender's first sequence be loaded into the same computer as the message. The software may instruct the encryption server to obtain the message from a physically or electronically separate data repository. Likewise, the sender's first sequence may be accessed by using a communication link to the first sequence at a separate physical or electronic location. For purposes of description, but without limitation, the location of both the message and the sender's first sequence will be described as being the sender's computer.

The return call is preferred to be made through a communication link other than the one used by the sender, so that a hacker or eavesdropper cannot readily monitor the return call. For example, the return call may be made through a wide-area-telephone-service (WATS) line. By this method of communication to anonymous transmission points, variously selected by either the sender or encryption server, the sender is allowed to maintain privacy even from the encryption server.

Using software, the encryption server causes the sender's computer to transmit the message to the encryption server. Before the message passes over the communication line, the first sequence encrypts the message. The first sequence is consumed until exhausted. The software also deletes the transmitted message from the sender's computer, thus leaving behind no trace of the transaction.

The management and exhaustion of the first sequence may be conducted according to other schemes. It may be desirable to conserve code and enable a single first sequence to provide a large amount of service usage. Accordingly, a first sequence contains a limited or preselected amount of data, with the limit dictated by the data holding capacity of the media used. A degree of capacity increase by key reuse is possible by several methods. The code may be broken into sequences or groupings of bits or bytes. The number of bytes in each sequence can be varied at random from sequence to sequence. Each sequence may be reused for a predetermined number of times before the next sequence is employed. The encryption server may use a random number selection to instruct the user where the encryption server and user computers are to cut off each sequence and thereafter begin recycling that code sequence. Similarly, the encryption server may instruct the user and encryption server computers as to the number of bytes in each sequence. By these means, the service capacity of a first sequence may be enlarged. Thus, first sequences may be supplied and sold over a large range of value denominations. High value denominations may use multiplier schemes before first sequences are exhausted, enabling them to trade at exponentially larger values, as compared to first sequence with a one-time pad.

The encryption server performs an accounting function by supervising consumption of value associated with the first sequences of encryption key material. As described, one form of direct value consumption is exhaustion of the code bits. The code bits have direct value for use in encrypting messages. Regardless of whether the code bits and sequences are used once or reused many times, their eventual exhaustion represents a loss of value. The exhaustion may be by any effective means, such as erasing them from a computer memory or electronic storage device. Their exhaustion may be by a record placed on or removed from an index of their identity, size, or location. Their exhaustion may be by debiting an account of monetary values associated with the code bits. Thus, code bits need not be deactivated from further encryption service if associated with monetary values, as long as the user maintains a sufficient monetary worth in an associated debitable account. In such a case, first sequence can be used as long as the encryption server can continue to debit an account associated with the first sequence or the first user. Correspondingly, the user may receive account credits by the transactions through the encryption server, further prolonging available usage of a first sequence.

Upon exhaustion of a first sequence, further traffic in encrypted messages will require acquisition of additional sequences of encryption key material, which can be purchased for value. Thus, for a predetermined price or account value, a user can consume a finite quantity of encoded message material and receive a finite quantity of encoded responses, until the purchased code sequences are deemed exhausted by the encryption server.

The message received by the encryption server may be handled in any of several ways. In order to prevent intrusion into the encryption server by hackers or other unauthorized parties, or by viruses, the message may be initially stored in temporary memory such as RAM, and at least partially decrypted. The decrypted portion of the message may be prevented from executing any executable code. If the message decrypts correctly, the message is verified. The message is then transmitted to the destination and the temporary memory is erased after each transmission.

In one system, the message is posted into an e-mail box corresponding to the first sequence. It will reside there until a caller seeks it. In addition, the server tracks or monitors the range of bits used to send the message. With this data available, the encryption server permits access to this e-mail only by a calling computer loaded with the second sequence, carrying matching bit content. Even the sending party cannot retrieve the message, since his first sequence has exhausted the sending encryption bits.

The receiving party may retrieve the message by a series of steps following those used by the sender. As discussed previously, the receiving party may utilize a computer for his communication with the encryption server. He may utilize the second sequence by loading the second sequence on the same computer, or the second sequence may be located in a physically or electronically separate location. For purposes of description and not limitation, the second sequence will be described as loaded on the receiving party's single computer. The encryption server may maintain one or more communication links, as necessary, in order to manage message delivery.

The receiver may call via his computer, loaded with the second sequence and software, via a toll-free telephone number. The software will assist the encryption server in determining that the second sequence is properly configured to be the recipient, i.e., has the requisite code bits on the second sequence. The software also will assist the encryption server in determining a point for return communication, such as a return telephone number, and cut off the call. Thereafter, the encryption server will call and prepare to transmit the message. When ready, the encryption server will return a communication to the recipient computer using an alternate communication line or mode, such as a WATS line. When communication is established, the encryption server will transmit the message. Further, the encryption server will access the receiver's second sequence and, by software, decrypt the message by consuming code from the second sequence. The recipient's second sequence then is debited for the exhausted bits. If the message has been encrypted in additional levels, such as with a transaction key or with public and private keys, the recipient can further decrypt the message as required, using those known systems. As the message is delivered, the encryption server deletes the content from the e-mail box or from its own records.

In a second variation of handling the encrypted message, it is possible the recipient will not be in possession of the second sequence in advance of when the sender transmits. This situation requires that the encryption server notify the recipient of the message by use of instructions provided by the sender. The encryption server than must provide a means for the recipient to obtain the matching second sequence. Using known systems of multi-level encryption or reserved address areas in an encrypted message, the sender can provide the encryption server with information of how to communicate with the recipient. The encryption server can provide the second sequence in an e-mail box, and notify the recipient by telephone of the message's availability to be picked-up. Because the encryption server communicates separately with the sender and receiver, an outside observer cannot readily determine a correlation between such messages.

A further embodiment of this encryption system enables commerce to be conducted on a secure basis. Such commerce requires that a user pay for his transaction and that a vendor or service provider (service provider) receive payment for the product or service that is provided. The monitoring of consumed bits from a first sequence that is a one-time pad or plurality of session keys may track consumption of monetary value in addition to, or in substitution for, consumption of encryption capacity. The exhaustion of data bits or code from the user's first sequence may be proportionate to the value of a transaction, and the encryption server serves as a bank clearinghouse, forwarding payment from a buyer account to a seller account.

The overall scheme for conducting transactions in commerce requires that a buyer or user establish an account with the encryption server. An account is established by the purchase of the first sequence. As in the case of electronic messaging, the user establishes his commercial or financial relationship with the encryption server. The transaction is conducted similarly to electronic messaging, in that the user sends a message to the encryption server. The message may be encrypted. The encryption server decrypts the message and acts upon an instruction directed to the encryption server. The instruction may order the encryption server to locate a service or to contact a specific service provider in order to obtain the service. The encryption server may then act upon the instruction, contacting the selected service provider or first locating a suitable service provider and then passing along the service request. The encryption server may encrypt communications with the service provider, as well. The service provider then returns the requested data or service to the encryption server, encrypted or not. The encryption server forwards the data or service to the user in encrypted form. In such a transaction, the encryption server may receive payment such as a commission, which is paid by exhaustion of code from the buyer's first sequence.

Encryption may be paid for as well, by similar exhaustion of the first sequence. However, when the first sequence is serving as money, the exhaustion of the first sequence may be more practically tied to the value of the transaction, rather than to the actual bits employed in encryption.

A product bought and sold may be of a type that can be electronically transmitted, such as information, which can be sent from service provider to user through the encryption server by the encryption systems previously described. One such information product is service allowing access to Internet pages. The encryption server may respond to various first sequences according to specific programming or codes that limit the subject matter that can be accessed or retrieved by use of a specific first sequence. For example, a business may provide Internet access to its employees by supplying its employees with first sequences that are coded to allow access only to business-related sites on the Internet, or any other categorical subject matter limitation, including a choice of specific sites that are approved for access. By this limitation, employee computer time can be ensured to be used for authorized areas of investigation. Thus, the first sequence may provide both subject matter control and access time control, in addition to maintaining confidentiality of subject matter for the business. It is equally possible and useful to encode company computer software to operate only with company-authorized first sequences, further preventing non-business utilization of company time and equipment.

On the opposite side of vendor transactions, the use of such first sequences and the associated accounts in a business environment provides a way for Internet service providers and operators of content sites to be paid for use. The difficulties in obtaining payment for information are widely known among Internet sites. Having little alternative, many information providers have developed restricted access sites, to which visitors must subscribe by supplying a credit card account and using a password. One common problem is that a vendor faces intrusion by hackers or pirates with stolen passwords or stolen credit card information, who in turn steal site information. Another problem is that a vendor discourages access by likely customers who are afraid to reveal credit information over the Internet. Still a third problem is that many useful and worthy sites may find the problems associated with establishing accounts to be simply too much trouble and forgo the prospect of payments. All of these problems may restrict development of Internet sites and discourage improvement of site content. These limitations are overcome by automating payment to substantially every site by use of an encryption server monitoring and debiting OTPs used by the users.

In at least one embodiment of the invention, the encryption server also may provide access to the Internet, relying upon first sequence usage and accounting to be paid for this service. This type of service presently is provided through an Internet Service Provider ("ISP"), who typically serves a customer base of subscribers. ISPs are paid for their service, typically by billing each subscriber. Accordingly, ISPs know an identity for each subscriber, enabling the ISP to bill the subscriber or his credit card account. The encryption server differs from a typical ISP in that it need not know the identity of the sender. A first sequence is prepaid at purchase, and the funds already are held by the encryption server. Thus, a sender using a first sequence can access the Internet without subscribing to an ISP, enabling a further degree of privacy.

Even a system of very small payments from first sequence accounts for time on-line and time at each viewed site could result in substantial financial rewards to the site owners and operators. Those providing intermediate access, such as conventional intermediate Internet service providers, may find the first sequence accounts a desirable way to be compensated for on-line time or data throughput. Site owners may be compensated based upon the number of viewer visits or "hits" over time. Sites with exceptionally valuable content may establish a higher access rate, triggered by software when the user enters the site or preselected high value portions of the site. It is also possible for a vendor or advertiser to reverse the flow of first sequence account payment credits, by providing a payment to Internet users who are willing to view advertisements, or to the encryption server for providing advertising to Internet users. Thus, Internet commerce paid by first sequence account time offers a new method of operating the Internet, paying Internet service providers for time used and paying Internet content providers for content viewed.

Of course, other types of tangible products may be the subject of vendor transactions, but their transmission may require conventional carriers. The advantage to all parties, in any type of transaction, is that the product is paid in advance, at the time the first sequence is purchased, and the encryption server holds the funds. Therefore, the vendor does not face the risks of bad checks, bad credit, and hacker or pirate intrusion. In order to assure vendor performance, the encryption server or a separate intermediary organization may hold the vendor payment and pay the vendor when the vendor has performed.

One of the most significant benefits in a vendor transaction is that the vendor reliably receives payment. The method of payment may be a transfer of tangible funds into conventional accounts at a financial institution. For this purpose, each vendor may inform the encryption server of his banking or other payment preferences. However, another form of payment is the generation of additional first sequences. The encryption server may satisfy payment obligations for a transmission of data from a vendor to the buyer by creating first sequence for the vendor's account. The value of the first sequence is equivalent to money and may offer the vendor an alternate mode of being paid. For example, the encryption server may generate first sequences in software form and post them to the vendor's e-mail box on the encryption server. The vendor would have a choice of holding the pads, using the pads, selling them, trading them, converting or bartering them into other forms of value, including into cash. Thus, the first sequences, themselves, become an alternate form of money.

The encryption server might be paid for its many services, including those as an encryption server, an ISP, a mail forwarder, and a banker. Payment may be by similar deduction from the first sequence accounts of the buyer user or vendor service provider. In commercial transactions, the user may be paid a percentage of the transaction fee as compensation for both on-line processing service and banking services. The encryption server also may sell the first sequences to users at a premium cost over and above the utilization value of the first sequence content, just as money order sellers charge a small commission for each transaction.

However, the encryption server may benefit from the float of funds it holds for unused OTP code value. If the earnings from such float are sufficient, the encryption server may be able to provide its services at no cost premium. Alternatively, the float or interest may be credited to the first user, and if the first user sells the first sequence, transmission charges could be deducted first from the float or interest. The encryption server may protect the funds received in exchange for first sequences from currency fluctuations by converting and maintaining the funds in bi-media investments, as disclosed in U. S. Pat. No. 4,910,676 to the present inventor, incorporated herein by reference.

Figure 2:
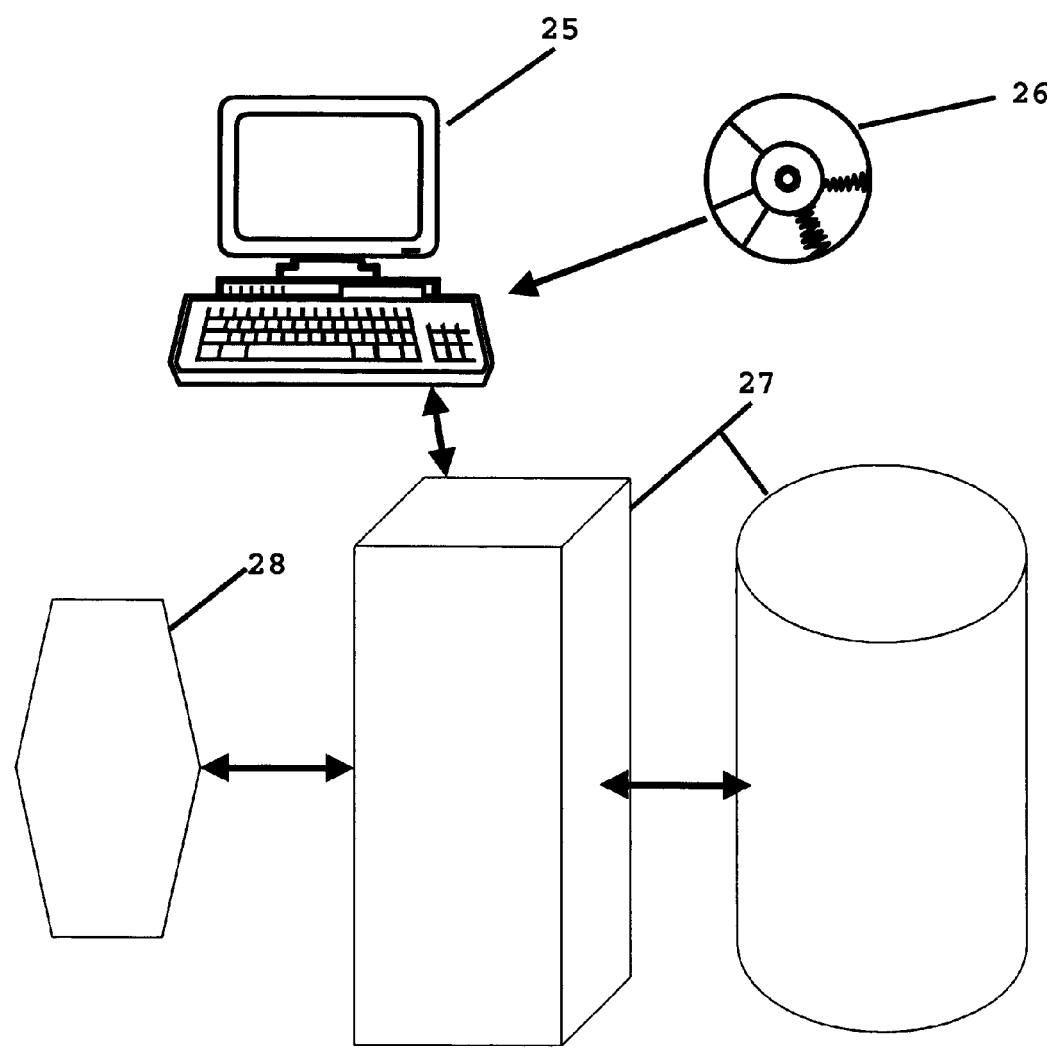
FIG. 2 is a schematic block diagram of apparatus embodying features of the present invention.

FIG. 2 shows apparatus for conducting secure electronic commerce, embodying features of the present invention, including a portable data storage device 25, a server 26 and a data processing device 27. The portable data storage device 25, or first sequence disc, includes a first sequence, an identifier associated with a first sequence, connection instructions and encryption instructions. The portable data storage device 25 may be embodied in a computer floppy disc, a fixed CD, and read-write CD, a DVD, an EPROM, or any other form of electronically readable portable data storage device presently known or hereafter developed.

The server 26, or encryption server, has the second sequence of encryption key material, an account associated with the first sequence with a value parameter, instructions for encrypting and decrypting data by using the second sequence, instructions for providing a connection to a first user and instructions for adjusting the value parameter. The instructions on the server 26 include executable programs and data, such as telephone numbers and handshake data. The server 26 generally connects to a network 27, such as the Internet.

The data processing device 27 receives the portable data storage device 25 and executes the software instructions of the portable data storage device 25 to encrypt and decrypt data, and to communicate with the server 26. The data processing device 27 may connect to the server by a cable, a phone line, a wireless connection or any other electronic communications means.

First sequences stored on recordable discs or fixed content discs, i.e., CDs, DVDs, and similar media, may be bought or sold, anonymously, at many types of commercial vendors. Cash sales are fully allowable and desirable. In order to facilitate the transfer of funds in large denominations, first sequences may be bought or sold at banks, savings and loans, stock brokerage houses, ATM vending machines, check cashing services, and other financial institutions, including commercial outlets for money orders. For convenience, first sequences in smaller denominations might be sold at convenience stores and drive-through outlets.

The encryption server may provide first sequences for public purchase by many methods. Media with a first sequence may be offered for sale pre-loaded with necessary software and codes. These may be purchased for resale by vendors having secure locations. The encryption server may provide an activation or disc loading service for use in less secure environments. For example, media for first sequences may be carried on store shelves in blank or inactivated form. At checkout, when the disc is purchased, it may be inserted into an on-line computer linked to the encryption server. The disc then is supplied with code content, or an activation code, or other necessary content to make ready the first sequence for use. Correspondingly, the vendor can cause the encryption server to cancel and replace media with first sequences that are stolen or lost from vendor's inventory.

In greater detail, electronic commerce is enabled by the purchase, sale, and trading of first sequences in denominated values, such as from several hundred to several thousand dollars, or other monetary units, as may be selected by the buying party.

In order to preserve anonymity, a pre-valued, purchased disc can be given an identifying number by the owner or user, who then informs and instructs the encryption server of the selected number. The first use of the disc may be of a one-time-use code, or a non-recycled part of the code to transmit an identification number to the encryption server. The selected identification number provides a basis for monetary or value accounting for the remainder of the code on the disc as the remainder is used and exhausted. The degree of anonymity provided by this random assignment method makes it increasingly difficult to identify the user even by the encryption server or by a malfeasant employee.

The use of first sequences as a form of money is aided by a system of registration or identification of each first sequence disc. A user may maintain an account of first sequence discs owned by each anonymous user. The account may be established and accessed by assigning a personal identification number (PIN) selected by the user. Similarly, the user may assign an identification number to each disc and record this number with the encryption server. These two types of identification enable the transfer of ownership of each first sequence from the user's account to a different account. The user can transfer a disc by reporting the transfer by serial number to the encryption server. In turn, the new owner of the disc can assign a new identification number and register the disc with his own PIN controlled account with the encryption server. The first sequence discs assume the characteristics of securities or money orders whose transfer is carefully overseen.

With the creation of accounts accessed by owner's PIN numbers, there need not be physical first sequences or identification numbers to identify such a tangible object. The purchase of first sequences of encryption key material can be conducted at public terminals, which may be located at the facilities that might also sell a tangible disc, if required. As with the purchase of a money order, an on-site vendor can acknowledge receipt of payment and forward such payment to the encryption server by electronic means. As the encryption server receives such on-line payment, the encryption server then can grant code sequences of corresponding value to the anonymous purchaser, such as by communication using the public terminal. Thus, the anonymous on-line purchaser can establish an account with the encryption server by creating and supplying a PIN, or the purchaser may indicate a pre-existing PIN-controlled account in which the encryption server is to credit or deposit the purchased code sequences.

The registration of the tangible first sequence discs and intangible first sequences prevents theft or other loss. Even physical loss of first sequence disc need not result in a loss of value, as the encryption server can cancel a lost first sequence and restore the monetary value of the lost disc to the user's account. Correspondingly, the encryption server is protected from loss of its own records of first sequence consumption when recordable first sequence discs are used. Each time the user uses a recordable first sequence disc, the first sequence provides a fresh record of utilization, which should be equivalent to the encryption server's records.

As a first sequence is used in commercial transactions between buyer and seller, the buyer's account with the encryption server is debited with each purchase until the first sequence is exhausted. The seller may create an equivalent account that is credited with the value of each purchase made by the buyer. A seller, such as a service provider merchant dealing on the internet, may retain the same account number with subsequent buyers and may accumulate content credits for use as may be desired.

The first and second sequences may contain code for generating public/private keys for use in transactions between holders of the two sequences. As in the case of e-mail messages, the transactions may be broken down into two stages. In one stage, the public key can be made openly available and transmitted without encryption, while the private key is maintained by the party using each pad. Buyers generate a new public-private key with each newly purchased pad, while sellers have the option to use a single public-private key pair on a permanent basis, thus easing access to the seller's public key.

A buyer ordering a product, such as data, that can be transmitted electronically can receive the product in encrypted form into a e-mail box established with the encryption server, having an address corresponding to his public key. The buyer's anonymity is maintained throughout the transaction. Similarly, the vendor may maintain anonymity, as the encryption server may send payment merely to an anonymous e-mail box.

Throughout the description, the encryption server has been referred to as though a single entity or single computer. The encryption server may include multiple entities and multiple computers. Various functions, such as purchasing or selling first sequences, performing ISP functions, paying vendors, and maintaining funds, may be handled by different staffs and different computers in different locations, including different state or national jurisdictions. Indeed, it may be desirable to provide a network of encryption servers in order to conduct electronic commerce in accordance with the differing laws of various jurisdictions. The functions should, of course, be linked through electronic means in order to provide a reliable and secure means of serving users and SPs throughout the world.

Although the present invention has been described with a certain degree of particularity, it is understood that the present disclosure has been made by way of example and that changes in details of structure may be made without departing from the spirit thereof.

What is claimed is:

1. A method for conducting private secure electronic commerce comprising the steps of:
    providing first and second sequences of encryption key material wherein said first sequence is suited for decrypting a message that has been encrypted using said second sequence and the second sequence is suited for decrypting a message that has been encrypted using the first sequence, and the first sequence and second sequence each include an identical plurality of sequentially arranged session keys;
    associating a value parameter with the first sequence;
    providing the first sequence to an anonymous user in exchange for a payment;
    providing encrypted data communications to said anonymous user until said value parameter is exhausted;
    wherein said step of providing encrypted data communications includes sub-steps (a)-(c) of:
        (a) providing user-initiated and user-terminated connection to the anonymous user;
        (b) monitoring a connection time that is the time that the anonymous user is connected; and
        (c) requiring the anonymous user to utilize a new session key from the plurality of session keys of the first sequence after a predetermined connection time; and
    adjusting the value parameter in response to said step of providing encrypted data communications, including adjusting said value parameter in response to utilization of the session keys of the first sequence such that when the plurality of session keys is exhausted, the value parameter is exhausted.

2. A method for conducting private secure electronic commerce comprising the steps of:
    providing first and second sequences of encryption key material wherein said first sequence is suited for decrypting a message that has been encrypted using said second sequence and the second sequence is suited for decrypting a message that has been encrypted using the first sequence, and the first sequence and second sequence each include an identical plurality of sequentially arranged session keys;
    associating a value parameter with the first sequence;
    providing the first sequence to an anonymous user in exchange for a payment;
    providing encrypted data communications to said anonymous user until said value parameter is exhausted;
    wherein said step of providing encrypted data communications includes sub-steps (a)-(b) of:
        (a) recording a start time when said provided encrypted data communication first occurs; and
        (b) requiring said anonymous user to utilize a new session key from said plurality of session keys of said first sequence at predetermined intervals after said start time; and
    adjusting the value parameter in response to said step of providing encrypted data communications, including adjusting said value parameter in response to utilization of the session keys of the first sequence such that when the plurality of session keys is exhausted, the value parameter is exhausted.

3. A method for conducting private secure electronic commerce comprising the steps of:
    providing first and second sequences of encryption key material wherein said first sequence is suited for decrypting a message that has been encrypted using said second sequence and the second sequence is suited for decrypting a message that has been encrypted using the first sequence, and the first sequence and second sequence each include an identical plurality of sequentially arranged session keys;
    associating a value parameter with the first sequence;
    providing the first sequence to an anonymous user in exchange for a payment;
    providing encrypted data communications to said anonymous user until said value parameter is exhausted;
    wherein said step of providing encrypted data communications includes sub-steps (a)-(b) of:
        (a) monitoring the number of bytes of said data communications; and
        (b) requiring said user to utilize a new session key from said plurality of session keys of said first sequence after a predetermined number of bytes of communications; and
    adjusting the value parameter in response to said step of providing encrypted data communications, including adjusting said value parameter in response to utilization of the session keys of the first sequence such that when the plurality of session keys is exhausted, the value parameter is exhausted.

4. A method for conducting private secure electronic commerce comprising the steps of:
    providing a first server that is an Internet service provider;
    providing to an anonymous first user, in exchange for a payment, a first sequence of encryption key material, an identifier associated with said first sequence, connection instructions for connecting to said first server, and encryption instructions for encrypting and decrypting data using the first sequence;
    providing to the first server said identifier and a second sequence of encryption key material suitable for decrypting data that is encrypted with the first sequence and for encrypting data that can be decrypted with the first sequence;

establishing a first user account accessible to the first server, wherein said first user account includes the identifier and a first user value parameter that is proportional to said payment;

providing encrypted data communications between said first user and the first server, wherein said step of providing encrypted data communications includes the first server's providing anonymous Internet access to the first user; and adjusting said first user value parameter in response to said step of providing encrypted data communications, wherein said step of adjusting includes adjusting the first user value parameter in response to the first server's providing anonymous Internet access.

5. The method as set forth in claim 4, further including the steps of:

receiving a request for a service from said first user;

locating on the Internet a service provider that will provide said service;

establishing a service provider user account accessible to said first server including a service provider value parameter;

procuring said service for said first user from said service provider; and adjusting said first user value parameter and said service provider value parameter in response to said step of procuring.

* * * * *